United States Patent [19]
Mekishima et al.

[11] 4,040,842
[45] Aug. 9, 1977

[54] RUST PREVENTING COATING COMPOSITION

[75] Inventors: Hiroshi Mekishima; Minoru Hosoda, both of Yokohama; Eiichi Kasiwagi, Fujisana; Toshiharu Hayashi, Yokohama, all of Japan

[73] Assignee: Dai Nippon Tokyo Co., Ltd., Osaka, Japan

[21] Appl. No.: 734,596

[22] Filed: Oct. 21, 1976

Related U.S. Application Data

[63] Continuation of Ser. No. 557,382, March 11, 1975, abandoned.

[30] Foreign Application Priority Data

July 23, 1974 Japan ............................. 49-84504

[51] Int. Cl.² ................................................ C09D 5/10
[52] U.S. Cl. ........................................... 106/1; 106/14; 106/84; 106/287 S; 252/387

[58] Field of Search ............. 106/1, 14, 84, 287 S; 252/387

[56] References Cited

U.S. PATENT DOCUMENTS

| | | | |
|---|---|---|---|
| 3,365,313 | 1/1968 | Roberts et al. | 106/14 |
| 3,884,705 | 5/1975 | Blair | 160/1 |

*Primary Examiner*—Lorenzo B. Hayes

[57] ABSTRACT

A rust preventive coating composition having a long pot life and providing a coating in which generation of white rust is greatly reduced, said coating composition being obtained by incorporating a small amount of at least one salt selected from the group consisting of molybdate salts, tungstate salts, phosphomolybdate salts and phosphotungstate salts into a coating composition comprising as main components an alkali metal silicate or ammonium silicate and zinc powder.

9 Claims, No Drawings

RUST PREVENTING COATING COMPOSITION

This is a continuation of application Ser. No. 557,382 filed Mar. 11, 1975, now abandoned.

BACKGROUND OF THE INVENTION

This invention relates to a novel rust preventive coating composition.

Because of their good durability and the lasting anticorrosive effects of resulting coatings, coating compositions comprising zinc powder have heretofore enjoyed wide use, and the amount of these compositions consumed has been increasing.

As practical uses of these coating compositions, there can be mentioned, for example, coating of bridges, especially long and large bridges, inner coating of tanks of ships and the like, and coating of places and parts where maintenance or repair is difficult.

Further, with a view to avoiding environmental pollution and preventing fire, and to saving labor and protecting workers from the toxic effects of the coating positions, these zinc powder-containing rust preventive coating compositions are being more often applied in the state dissolved in water.

Various methods for water-solubilizing zinc powder-containing coating compositions are known in the art. For instance, two-component type coating compositions comprising zinc powder and an alkali metal silicate have heretofore been put into practical use. However, they are defective in that since hardening is accomplished by an inorganic reaction, the pot life is generally shorter than about 2 hours and the coating operability of the compositions, therefore, is very poor.

SUMMARY OF THE INVENTION

This invention relates to a rust preventive coating composition. More particularly, the invention relates to a rust preventive coating composition having a long pot life and providing a coating in which generation of white rust is greatly reduced.

In accordance with this invention, there is provided a novel rust preventive coating composition comprising a basic rust preventive composition containing as the main components an alkali metal silicate or ammonium silicate and zinc powder and , incorporating therein, a small amount of at least one compound selected from the group consisting of molybdate compounds, tungstate compounds, phosphomolybdate compounds and phosphotungstate compounds.

DETAILED DESCRIPTION OF THE INVENTION

According to this invention, a small amount of at least one salt selected from the group consisting of molybdate salt, tungstate salts, phosphomolybdate salts and phosphotungstate salts is incorporated into a basic coating composition containing and the main components an alkali metal silicate or ammonium silicate and zinc powder, whereby the pot life of the resulting rust preventive coating composition can be greatly prolonged. Further, the pot life of the resulting rust preventive coating composition of this invention can be substantially adjusted or controlled by adjusting the amount of the additive incorporated. Still further, in the coating formed by application of this rust preventive coating composition, oxidation of zinc is prevented and hence, generation of white rust can be greatly reduced, resulting in reduction of the loss of zinc.

By the term "pot life" used in the instant specification is meant a period of time during which the quality of the coating composition can be maintained at substantially the same level after all the constituents are mixed to form the composition. More specifically, when a period equal to the pot life has passed after mixing of all the constituents, the viscosity of the composition increases and if the composition is further allowed to stand still, gelation occurs in the composition. Therefore, too short a pot life causes a great hindrance to the coating operation and in the case of a coating composition having a short pot life, a special coating machine such as a two-head gun should be employed for coating. In order for a composition to be applicable to such coating methods as brush coating, air spray coating and airless spray coating methods, it is desired that the composition have a pot life longer than 4 hours. The rust preventive coating composition of this invention is excellent in this point, because its pot life is longer than 4 hours and no troubles are caused in the coating operation.

The alkali metal silicate to be used in this invention is represented by the general formula $M_2O \cdot nSiO_2$ in which M stands for an alkali metal such as Li, Na and K, and N is a number of from 1 to 7. In this invention, ammonium silicate can be used instead of this alkali metal silicate. It is also possible to use a mixture of two or more of such alkali metal silicates and ammonium silicate.

Zinc powder to be used in this invention has a particle size of 1 to $20\mu$, and such zinc powder is easily available on the market.

As the mixing ratio of the alkali metal silicate or ammonium silicate and the zinc powder, there can be preferably adopted known mixing ratios. More specifically, it is preferred that the silicate : zinc powder mixing ratio be within a range of from 5 : 95 to 30 : 70.

As the molybdate salt to be used in this invention, there can be mentioned, for example, sodium molybdate, potassium molybdate, ammonium molybdate, calcium molybdate, strontium molybdate, zinc molybdate, barium molybdate, magnesium molybdate and iron molybdate.

As the tunstate salt, there can be mentioned, for example, sodium tungstate, potassium tungstate, ammonium tungstate and calcium tungstate.

As the phosphomolybdate salt, there can be mentioned, for example, sodium phosphomolybdate, potassium phosphomolybdate, ammonium phosphomolybdate, strontium phosphomolybdate, magnesium phosphomolybdate, zinc phosphomolybdate and barium phosphomolybdate.

As the phosphotungstate salt, there can be mentioned, for example, sodium, potassium, ammonium, strontium, magnesium, zinc and barium salts of phosphotungstic acid.

These salts are commmercially available. They can be used singly or two or more of these salts can be used in the form of a mixture.

The molybdate, tungstate, phosphomolybdate or phosphotungstate to be incorporated into the basic composition containing an alkali metal silicate or ammonium silicate and zinc powder may be added to either an aqueous solution of the silicate component (an aqueous solution containing both the silicate component and the above salt will hereinafter be referred to as "solution A" for sake of convenience) or zinc powder.

In short, it is not particularly critical whether the salt is added to an aqueous solution of the silicate component or zinc powder, and this is decided appropriately after due consideration of various conditions.

The molybdate, tungstate, phosphomolybdate or phosphotungstate is added in an amount of 0.0001 to 1.0% by weight based on the sum of the solution A and zinc powder. When the amount of the additive is smaller than 0.0001% by weight, the above-mentioned intended effects cannot be attained. From the economical viewpoint, use of the additive in an amount larger than 1.0% by weight is not preferred. Further, when the amount of the additive is larger than 1.0% by weight, the time required for completion of hardening is prolonged and the quality of the resulting coating tends to be lowered.

When a salt having a higher solubility in water is used as the additive, it is preferred that the additive be incorporated in the form of the solution A. If an additive salt is barely soluble in water, it is added to zinc powder. In each case, substantially the same coating compositions can be obtained.

In this invention, water is incorporated in such an amount that the viscosity of the resulting coating composition (as measured by a B-type viscometer) is within a range of from 10 to 30 poises.

Rust preventive coating compositions containing as main components an alkali metal silicate and zinc powder have heretofore been used because of their recognized effects. However, in coating compositions of this type, an alkali metal silicate and zinc powder (which is a powder of an amphoteric metal) are reacted with each other to form a stable compound, zinc silicate, and therefore, the above-mentioned defect, e.g., a short pot life, is inevitably brought about.

In the coating composition of this invention, the rate of the above reaction is controlled by addition of the above-mentioned specific salt, and the practical utility can be highly increased as described hereinbefore.

Effects attained in the coating composition of this invention are as follows:

1. Since compounds of a low toxicity are used, no problem of environmental pollutions is caused.
2. Since the pot life is long and the quality is substantially constant for a time corresponding to the pot life (the composition is stable), deviation of the quality in the resulting coating is much reduced.
3. The pot life of the coating composition can be substantially controlled by adjusting the amount of the molybdate salt, tungstate salt, phosphomolybdate salt or phosphotungstate salt added.
4. Good operability for coating can be attained.
5. Generation of white rust on the coating can be reduced, resulting in reduction of the loss of zinc.
6. The coating composition of this invention has a rust preventive effect comparable or superior to that of known rust preventative coating compositions.

This invention will now be illustrated in detail by reference to the following Examples that by no means limit the scope of this invention. In these Examples, all "parts" are by weight.

EXAMPLES 1 to 26

20 parts of water glass ($SiO_2/K_2O$ = 3/1 nonvolatile content 30 wt.%), 5 parts of water and 0.1 part of sodium molybdate were mixed together to form a solution A.

The thus formed solution A was mixed with 80 parts of zinc powder, and the resulting composition was applied to the surface of an iron substrate once every hour. When 48 hours had passed after coating, the solubility of the resulting coatings in water were examined by rubbing the coatings in water. These test coatings were examined in the order of their formation and checked to determine which coating first became soluble into water. The time between the preparation of the composition and the application of said coating on the above first coating is defined to be "an apparent pot life", which has a certain proportional relation with the "pot life" mentioned above. This proportional relation will be described hereinbelow.

The above test was conducted on various compositions indicated in Table 1. Results obtained are as shown in Table 1.

Table 1

| | Aqueous solution | | | | | Zinc Powder | | | |
|---|---|---|---|---|---|---|---|---|---|
| | Silicate Component | | Amount | Additive Salt | | Amount (parts by weight) of Zinc Powder | Additive Salt | | Apparent Pot Life (hours) |
| Example No. | Kind | Parts by Weight | (parts by weight) of Water | Kind | Parts by Weight | | Kind | Parts by Weight | |
| 1 | water glass | 20 | 5 | sodium molybdate | 0.1 | 80 | | | 6 |
| 2 | " | 20 | 5 | " | 1 | 80 | | | 8 |
| 3 | " | 20 | 5 | " | 0.01 | 80 | | | 6 |
| 4 | " | 20 | 5 | " | 0.001 | 80 | | | 4 |
| 5 | " | 20 | 5 | ammonium molybdate | 0.1 | 80 | | | 6 |
| 6 | " | 20 | 5 | | | 80 | zinc molybdate | 1 | 6 |
| 7 | " | 20 | 5 | | | 80 | calcium molybdate | 1 | 6 |
| 8 | " | 20 | 5 | | | 80 | strontium molybdate | 1 | 6 |
| 9 | " | 20 | 5 | | | 80 | iron molybdate | 1 | 6 |
| 10 | " | 20 | 5 | | | 80 | barium molybdate | 1 | 6 |
| 11 | water glass | 20 | 5 | | | 80 | zinc molybdate | 0.1 | 5 |
| 12 | " | 20 | 5 | | | 80 | " | 0.01 | 4 |
| 13 | " | 20 | 5 | | | 80 | sodium molybdate | 0.1 | 6 |
| 14 | " | 20 | 5 | sodium tungstate | 0.1 | 80 | | | 6 |
| 15 | " | 20 | 5 | potassium tungstate | 0.1 | 80 | | | 6 |
| 16 | " | 20 | 5 | ammonium | 0.1 | 80 | | | 6 |

Table 1-continued

| Example No. | Aqueous solution Silicate Component Kind | Parts by Weight | Amount (parts by weight) of Water | Additive Salt Kind | Parts by Weight | Zinc Powder Amount (parts by weight) of Zinc Powder | Additive Salt Kind | Parts by Weight | Apparent Pot Life (hours) |
|---|---|---|---|---|---|---|---|---|---|
| 17 | " | 20 | 5 | tungstate | | 80 | calcium tungstate | 0.1 | 5 |
| 18 | " | 20 | 5 | sodium phospho-molybdate | 0.1 | 80 | | | 6 |
| 19 | " | 20 | 5 | sodium phospho-tungstate | 0.1 | 80 | | | 6 |
| 20 | lithium silicate ($SiO_2/Li_2O$ = 5) | 20 | 5 | sodium molybdate | 0.1 | 80 | | | 5 |
| 21 | " | 20 | 5 | " | 0.01 | 80 | | | 4 |
| 22 | ammonium silicate (3365 by PQ) | 20 | 5 | " | 0.01 | 80 | | | 12 |
| 23 | " | 20 | 5 | " | 0.001 | 80 | | | 10 |
| 24 | ammonium silicate water glass | 10 10 | 5 | " | 0.1 | 80 | | | 8 |
| 25 | water glass | 20 | 5 | sodium molybdate sodium tungstate | 0.05 0.05 | 80 | | | 6 |
| 26 | water glass | 20 | 5 | sodium molybdate sodium tungstate sodium phospho-molybdate | 0.03 0.03 0.03 | 80 | | | 6 |
| Comparative Example 1 | " | 20 | 5 | | | 80 | | | 2 |

From the test results shown in Table 1, it will readily be understood that the coating composition of this invention has a much longer pot life than the conventional composition (see Comparative Example 1).

The rust prevention test was made on the coating composition of Example 1 and the composition of Comparative Example 1, to obtain the results shown in Table 2.

Table 2

| | Composition of Example 1 | Composition of Comparative Example 1 |
|---|---|---|
| Salt Spray Test* | not changed after 1000 hours' test | not changed after 1000 hours' test |
| Salt Water Exposure Test** | not changed after 60 days' test | not changed after 60 days' test |

Notes
*5% aqueous solution of NaCl was sprayed at 35° C.
**samples were immersed in 3% aqueous solution of NaCl at room temperature.

Samples used for the tests were prepared by using a shot blasted steel plate ( 3OS ) as the substrate to be coated, applying the composition with a spray gun so that the thickness of the coating was about 70μ and drying the applied composition. Samples were tested one week after their preparation.

From the test results shown in Table 2, it will readily be understood that the coating composition of this invention has a rust preventive effect comparable to that of the known composition.

The salt spray test was made on coatings obtained from the composition of Example 1 and the composition of Comparative Example 1 while changing the time of application after mixing of the solution A and zinc powder. Obtained results are as shown in Table 3.

Table 3

| Time (hours) after Mixing of Solution A and Zinc Powder | Composition of Example 1 | Composition of Comparative Example 1 |
|---|---|---|
| 1 | not changed after 1000 hours' test | not changed after 1000 hours' test |
| 2 | " | " |
| 3 | " | rust was formed after 1000 hours' test |
| 4 | " | " |

Samples used for this test were prepared in the same manner as described above, and the salt spray test was conducted under the same conditions as described above.

From the test results shown in Table 3, it will readily be understood that the rust preventive composition of this invention has a longer pot life than the conventional composition and since the quality of the coating composition of this invention can be maintained at the same level for a long time, deviation of the quality of the resulting coating can be much reduced.

By conducting the rubbing test and salt spray test on the composition of Example 1, it was confirmed that there is established a certain proportional relation between the pot life and the apparent pot life. Results obtained in these tests are as shown in Table 4.

Table 4

| Time (hours) after Mixing of Solution A and Zinc Powder | Rubbing Test* | Salt Spray Test** |
|---|---|---|
| 2 | not changed " | not changed " |

Table 4-continued

| Time (hours) after Mixing of Solution A and Zinc Powder | Rubbing Test* | Salt Spray Test** |
|---|---|---|
| 3 | " | " |
| 4 | " | " |
| 5 | " | " |
| 6 | " | " |
| 7 | substrate appeared | rust was formed |
| 8 | " | " |

Notes:
*When a prescribed period had passed after the mixing of the solution A and zinc powder, the composition was applied to a shot blasted steel plate (30S) with a spray gun so that the coating had a thickness of about 70a. When 48 hours had passed after application, the coated surface was rubbed strongly in water with a cloth for 5 minutes and the solubility of the coating in water was examined.
**The test was conducted in the same manner as described above.

From the results shown in Table 4, it will readily be understood that coatings formed by performing the coating when 1 to 6 hours had passed after the mixing of the solution A and zinc powder were not changed at all in either test and that coatings formed by performing the coating when more than 7 hours had passed after the mixing were damaged in both the tests. Thus, it was confirmed that there is established a certain proportional relation between the pot life and the apparent pot life.

What is claimed is:

1. In a rust preventive aqueous coating composition having an extended pot life and consisting essentially of a major amount of, and a minor amount of zinc powder at least one silicate selected from the group consisting of alkali metal silicates and ammonium silicate; the improvement comprising 0.0001 to 1% by weight of at least one salt selected from the group consisting of molybdates, tungstates, phosphomolybdates and phosphotungstates.

2. The coating composition of claim 1 wherein the ratio of said silicate to said zinc powder is in the range of 5:95 to 30:70.

3. The coating composition of claim 1 wherein said composition has a viscosity of 10 to 30 poises.

4. The coating composition of claim 1 wherein the molybdate salt is selected from the group consisting of sodium molybdate, potassium molybdate, ammonium molybdate, calcium molybdate, strontium molybdate, zinc molybdate, barium molybdate, magnesium molybdate and iron molybdate.

5. The coating composition of claim 1 wherein the tungstate salt is selected from the group consisting of sodium tungstate, potassium tungstate, ammonium tungstate and calcium tungstate.

6. The coating composition of claim 1 wherein the phosphomolybdate salt is selected from the group consisting of sodium phosphomolybdate, potassium phosphomolybdate, ammonium phosphomolybdate, strontium phosphomolybdate, magnesium phosphomolybdate, zinc phosphomolybdate and barium phosphomolybdate.

7. The coating composition of claim 1 wherein the phosphotungstate salt is selected from the group consisting of sodium phosphotungstate, potassium phosphotungstate, ammonium phosphotungstate, strontium phosphotungstate, magnesium phosphotungstate, zinc phosphotungstate and barium phosphotungstate.

8. The coating composition of claim 1 having a pot life of at least 4 hours.

9. In a method of controlling the pot life of a rust preventive aqueous coating composition consisting essentially of a major amount of zinc powder and a minor amount of at least one silicate selected from the group consisting of alkali metal silicates and ammonium silicate; the improvement comprising incorporating in said composition at least one salt selected from the group consisting of molybdates, tungstates, phosphomolybdates and phosphotungstates in an amount within the range of from 0.0001 to 1% by weight.

* * * * *

UNITED STATES PATENT AND TRADEMARK OFFICE
CERTIFICATE OF CORRECTION

PATENT NO. : 4,040,842
DATED : August 9, 1977
INVENTOR(S) : MAKISHIMA ET AL

It is certified that error appears in the above-identified patent and that said Letters Patent are hereby corrected as shown below:

Please change the spelling of the last name of the first inventor from "Mekishima" to --Makishima--

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*